Patented May 12, 1942

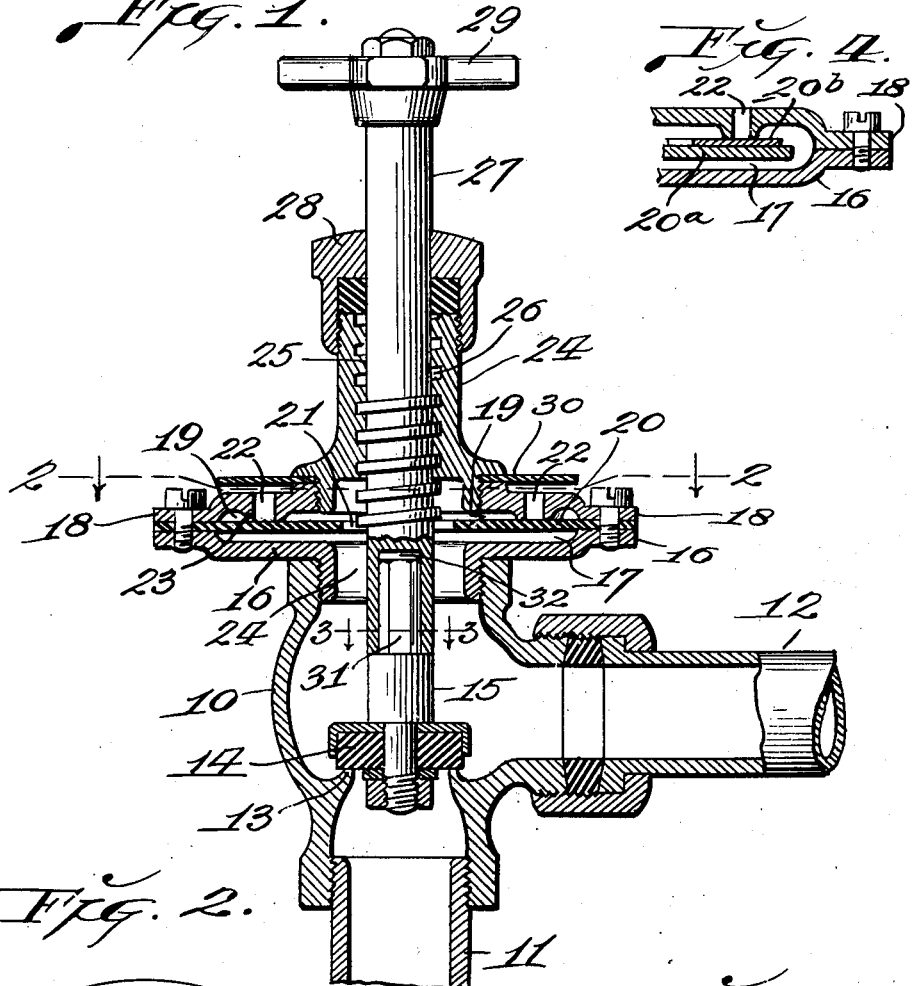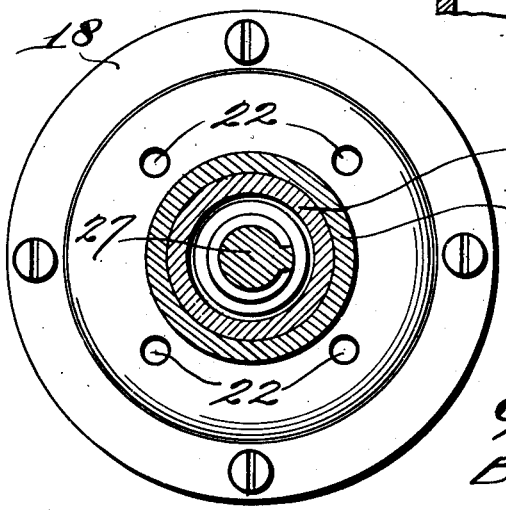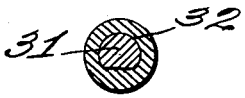

2,282,338

UNITED STATES PATENT OFFICE 2,282,338

ANTISIPHONIC VALVE

George E. Moody, Los Angeles, Calif.

Application April 17, 1940, Serial No. 330,147

4 Claims. (Cl. 277—55)

My invention relates generally to valves and more particularly to a valve equipped with automatic means for controlling the inflow of air to fluid conveying pipes in the event that there is for any reason a tendency for a vacuum to be produced within the pipes, for instance, the breaking of the supply main to which the pipes are connected or a lowering of pressure in the main sufficient to create a sufficient degree of vacuum to draw fluid in the reverse direction through the pipes into the supply main.

While my invention is especially designed for use in sprinkling system, it may also advantageously employed in the plumbing of buildings and in service the valve functions to automatically permit air to enter the supply line to which the valve is connected in the event of a vacuum being produced in said supply line and which would otherwise result in the drawing of contaminated water through the distributing pipes to the supply main.

Further objects of my invention are, to provide an anti-siphonic valve that is relatively simple in construction, inexpensive of manufacture, capable of being readily installed, entirely automatic in action and which improved valve may be advantageously employed in connection with all water distribution systems having a branch pipe or pipes leading from a supply main.

With the foregoing and other objects in view, my invention consists in certain novel features of construction and arrangement of parts that will be hereinafter more fully described and claimed and illustrated in the accompanying drawing in which:

Fig. 1 is a vertical section taken through the center of a siphon breaking valve constructed in accordance with my invention.

Fig. 2 is a horizontal section taken on the line 2—2 of Fig. 1.

Fig. 3 is a detail section taken on the line 3—3 of Fig. 1.

Fig. 4 is a detail sectional view of a modified form of the disc utilized for closing the air inlet opening into the valve.

Referring by numerals to the accompanying drawing which illustrates a preferred embodiment of my invention, 10 designates a valve housing to the lower portion of which is connected a supply main 11 and connected to the side of the housing is a branch pipe 12 that conducts water to a sprinkling system, a lavatory or the like.

Formed within the lower portion of housing 10 below the connection for the branch pipe 12 is a valve seat 13 upon which is adapted to rest a conventional valve 14 that is carried by the lower end of a stem 15.

Formed integral with or secured to the upper portion of valve housing 10 is a horizontally disposed disc 16 provided in its upper portion with a shallow recess 17 and detachably secured to the marginal portion of this disc and arranged above the same is a disc 18 provided in its under side with a shallow recess 19. Positioned between the discs 16 and 18 is a disc or gasket 20 of flexible material, such as rubber or composition having rubber as its principal ingredient, and the marginal portion of this disc is clamped between the edges of discs 16 and 18. Formed in the center of the flexible disc 20 is an aperture 21.

Formed through disc 18 is a series of air inlet apertures 22 and formed on the under face of said disc around the lower end of said apertures are annular ribs 23 that provide seats for the upper surface of the disc 20 when the same is pressed upwardly against said seats by pressure of the water passing through the valve housing. An opening 24 in the center of disc 16 establishes communication between the chamber within valve housing 10 and the chamber between the discs 16 and 18 in which the flexible disc 20 is located.

Formed integral with or fixed to the central portion of disc 18 is a bonnet 24 provided with a vertically disposed opening 25 in which is formed a thread 26 for the reception of the threaded portion of a valve stem 27. This stem projects upwardly through a packed nut 28 that is located on the upper end of the bonnet and the upper end of said stem receives a handle 29.

Arranged between the lower portion of the bonnet and the disc 18 is a disc 30, preferably formed of thin metal or the like and which is spaced apart from the upper surface of said disc 18 and extends over the upper ends of the apertures 22, thus forming a protective shield to prevent dirt and foreign matter from entering the apertures 22 and passing into the chamber between the discs 16 and 18.

The upper end of stem 15 is provided with an upwardly projecting portion 31 which is non-circular in cross section and which occupies a correspondingly shaped bore or recess 32 that is formed in the lower portion of valve stem 27.

Thus the stem 15 carrying valve 13 is mounted on stem 27 so as to rotate therewith and at the same time to slide lengthwise thereof. When valve stem 27 is rotated so as to lift valve 14 off its seat 13, water from the supply main 11 enters the valve housing 10 and flows through branch pipe 12. The pressure of the water from the supply main flowing through the valve will act against the under face of diaphragm 20 and force same upwardly against the valve seats 23 around the lower ends of the apertures 22, thereby closing the same against the ingress of air and consequently all water from the supply main will discharge through branch pipe 12.

In the event of a break in the supply main or a lowering of the water pressure therein to such an extent as to create a sufficient degree of vacuum to withdraw water through the branch pipe 12 back to the main, the lowering of pressure beneath the diaphragm 20 will permit the latter to drop downwardly a sufficient distance to uncover the air inlet openings 22 with the result that air will rush through said openings and thence pass downwardly through the valve housing into the main to break the vacuum and consequently preventing water from being withdrawn from the branch pipe to said main.

In order to function properly, it is essential that the vacuum breaking valve be located at a point in the supply line above the sprinkler heads served by the branch pipe or the lavatory fixtures that are supplied by said pipe.

I have shown and described the upper disc 18 as being provided with a plurality of air inlet openings, but it will be understood that a single opening of proper size may be employed with satisfactory results.

In Fig. 4 a modified construction is illustrated wherein a disc 20a, similar to disc 20, is loosely arranged within the shallow chamber between the discs 16 and 18 and said disc 20a being composed of buoyant material in order that it will maintain a position on top of the water in chamber 17 and with the upper surface of said buoyant disc carrying a thin layer 20b of rubber or the like which, when the disc is elevated, closes and seals the air inlet openings or opening 22.

In some instances it may be found desirable to form the lower plate 16 integral with the upper portion of the valve housing 10 and to form the upper plate integral with the lower portion of the bonnet 24.

Thus it will be seen that I have provided an anti-siphonic or vacuum breaking valve that is relatively simple in construction, inexpensive of manufacture and very effective in performing the functions for which it is intended.

It will be understood that minor changes in the size, form and construction of the various parts of my improved anti-siphonic valve, may be made and substituted for those herein shown and described, without departing from the spirit of my invention, the scope of which is set forth in the appended claims.

I claim as my invention:

1. In a vacuum breaker for valves, a housing provided with an inlet and an outlet, a valve for controlling the flow of liquid through said housing, a stem for actuating said valve, a housing comprising a pair of plates, one arranged above the other on the upper portion of said valve housing, said second mentioned housing having a shallow chamber that communicates with the chamber in the valve housing, there being an air inlet opening in the upper portion of said second mentioned housing, a bonnet detachably secured to the upper one of the plates forming said housing, a valve stem passing axially through said bonnet and having threaded engagement therewith, the lower end of which valve stem is secured to said valve and a handle on the upper end of said valve stem and a member arranged for operation within the chamber within said second mentioned housing and adapted to close said air inlet openings under pressure of the liquid passing through said valve housing.

2. A vacuum breaker for valves as set forth in claim 1 and with a shield disposed above said air inlet opening.

3. In a vacuum breaker for valves, the combination with a valve housing having inlet and outlet openings, a valve for controlling the flow of liquid through said valve housing and a manually operable stem for actuating said valve, of a pair of plates arranged one above the other with the lower one of said plates detachably secured to said valve housing, there being a shallow chamber formed between said plates, the lower one of said plates having communication with the chamber within the valve housing, the upper plate being provided with an air inlet opening, a bonnet detachably secured to the upper one of said pair of plates, said stem extending through and having threaded engagement with said bonnet, a handle on the upper end of said stem and a flexible member having its marginal portion clamped between the marginal portions of said plates and adapted to close the air inlet opening in the upper plate under the pressure of liquid within the valve housing.

4. A vacuum breaker for valves as set forth in claim 3 and with a shield positioned above the upper one of said plates and overlying the air inlet openings therein.

GEORGE E. MOODY.